United States Patent [19]
Cobes et al.

[11] Patent Number: 5,480,208
[45] Date of Patent: Jan. 2, 1996

[54] S-PORTION FOR A FRAME-TYPE VEHICLE BODY CONSTRUCTION AND AN ASSOCIATED METHOD

[75] Inventors: John W. Cobes, Lower Burrell; Dinesh C. Seksaria, Murrysville, both of Pa.

[73] Assignee: Aluminum Company of America, Pittsburgh, Pa.

[21] Appl. No.: 239,026

[22] Filed: May 6, 1994

[51] Int. Cl.$^6$ .............................. B60R 27/00; B60K 37/00
[52] U.S. Cl. ........................... 296/203; 296/187; 29/897.2
[58] Field of Search .................................... 296/187, 203, 296/204, 205; 29/897.2

[56] References Cited

U.S. PATENT DOCUMENTS

| | | |
|---|---|---|
| 1,678,411 | 7/1928 | Westmoreland . |
| 2,784,983 | 3/1957 | Dean . |
| 2,809,050 | 10/1957 | Bauer . |
| 2,901,266 | 8/1959 | Lindsay . |
| 3,904,380 | 9/1975 | Smith . |
| 4,618,163 | 10/1986 | Hasler et al. ............... 296/205 X |
| 4,848,835 | 7/1989 | DeRees ....................... 296/187 |
| 4,986,597 | 1/1991 | Clausen ...................... 296/205 |
| 5,048,888 | 9/1991 | Willy et al. ................. 296/204 X |
| 5,201,566 | 4/1993 | Mori ............................ 296/203 X |
| 5,209,541 | 5/1993 | Janotik ........................ 296/203 X |
| 5,322,208 | 6/1994 | Hinrichs et al. ........... 29/897.2 X |
| 5,352,011 | 10/1994 | Kihara et al. ............... 296/204 X |

Primary Examiner—Joseph D. Pape
Attorney, Agent, or Firm—David V. Radack; Thomas R. Trempus

[57] ABSTRACT

An S-portion for a frame-type vehicle body construction. The S-portion has a pair of components, each of the S-portion components including step members. The step members are in complementary and confronting relationship with each other so as to permit relative sliding movement therebetween. In this way, desired positioning of one S-portion component relative to the other S-portion component can be established. A vehicle body construction including the S-portion and an associated method are also provided.

20 Claims, 7 Drawing Sheets

S-PORTION FOR A FRAME-TYPE VEHICLE BODY CONSTRUCTION AND AN ASSOCIATED METHOD

BACKGROUND OF THE INVENTION

This invention relates to an S-portion for a frame-type vehicle body construction, and more particularly to an S-portion having two components, each component having a portion with a stepped configuration that permits relative sliding movement therebetween so that desired relative positioning of the components can be effected.

Since the mid-1970's, vehicle bodies have been assembled by providing separate subassemblies, each subassembly being composed of several separate components which are, usually, welded together. An underbody subassembly is placed on a framing fixture and two side subassemblies, called the passenger side subassembly and the driver side subassembly are positioned and aligned with respect to the underbody assembly and each other. After this, the roof subassembly is placed on top of the passenger and driver side subassemblies to form the completed vehicle body in white. As is known, closure panels are then secured to the body in white to form the completed vehicle body construction.

Of crucial importance in the above process is the proper alignment and positioning of the subassemblies. Improper alignment and positioning of the subassemblies can result from manufacturing variations in the components used to make up the subassembly as well as assembly variations which occur when actually assembling the separate components to make the completed subassembly. These variations, either alone or in combination, can create gaps in the finally assembled vehicle body construction. These gaps are universally undesired in the finished vehicle product in that moisture from the outside can get into the car and the gaps can cause whistling sounds when the vehicle is moving.

A further consequence of improper alignment and positioning of the vehicle body construction is sloppy fitting of the closure panels of the vehicle. Today's automobile consumers demand consistent fit and gaps between the closure panels that make up the car body as well as tight fitting doors and vehicle glass.

Prior art methods of insuring proper alignment and positioning of the subassemblies range from using putty or other filler materials to fill gaps to bending or otherwise deforming certain components of the frame in order to "absorb" the manufacturing and assembly variations. In particular, bending of the components is possible because the components are made of sheet metal, which can easily be deformed to absorb the variations.

With the advent of the Alcoa "Space Frame™" design approach, vehicle body constructions are now being made entirely of extruded aluminum components. When properly designed, an aluminum extruded component provides excellent rigidity at a much lower weight than steel components. This rigidity is desired by today's auto consumer. However, this rigidity means that it is difficult, if not impossible, to bend or otherwise deform the components of the subassemblies in order to "absorb" the manufacturing variations.

What is needed, therefore, is a component for a frame-type vehicle body construction that can be used to absorb manufacturing and assembly variations which can overcome the problems of the prior art and which can also be used with the more rigid and lightweight aluminum frame-type vehicle body constructions.

SUMMARY OF THE INVENTION

The invention disclosed and claimed herein has met the above need as well as others. An S-portion for a frame-type vehicle body construction is provided which comprises a first S-portion component having step means and a second S-portion component having step means. The step means are in complementary and confronting relationship with each other so as to permit relative sliding movement therebetween. In this way, desired positioning of the first S-portion component relative to the second S-portion component can be established.

A vehicle body construction is also provided. The vehicle body construction comprises an underbody subassembly including a passenger side portion and a driver side portion. The passenger side portion includes a first S-portion component having step means and the driver side portion includes a second S-portion component having step means. The vehicle body construction further comprises a passenger side subassembly including a third S-portion component having step means. The step means of the first S-portion component is in complementary and confronting relationship with the step means of the third S-portion component so as to permit relative sliding movement therebetween. The vehicle body construction further comprises a driver side subassembly including a fourth S-portion component having step means. The step means of the second S-portion component is in complementary and confronting relationship with the step means of the fourth S-portion component so as to permit relative sliding movement therebetween. The vehicle body construction also includes closure panels which are secured to the passenger and driver side subassemblies to form the vehicle body construction.

A method of assembling a vehicle body construction is also provided wherein an underbody subassembly, a passenger side subassembly and a driver side subassembly are provided as set forth above. The method further comprises establishing relative sliding movement of the step means of the first S-portion component and the step means of the third S-portion component to effect desired positioning of the passenger side subassembly relative to the underbody subassembly and establishing relative sliding movement of the step means of the second S-portion component and the step means of the fourth S-portion component to effect desired positioning of the driver side subassembly relative to the underbody subassembly. The method then comprises securing the passenger side subassembly and the driver side subassembly to the underbody subassembly and then securing the closure panels to the passenger and driver side subassemblies to form the vehicle body construction.

BRIEF DESCRIPTION OF THE DRAWINGS

A full understanding of the invention can be gained from the following description of the preferred embodiment when read in conjunction with the accompanying drawings in which.

DETAILED DESCRIPTION

Figure 1:
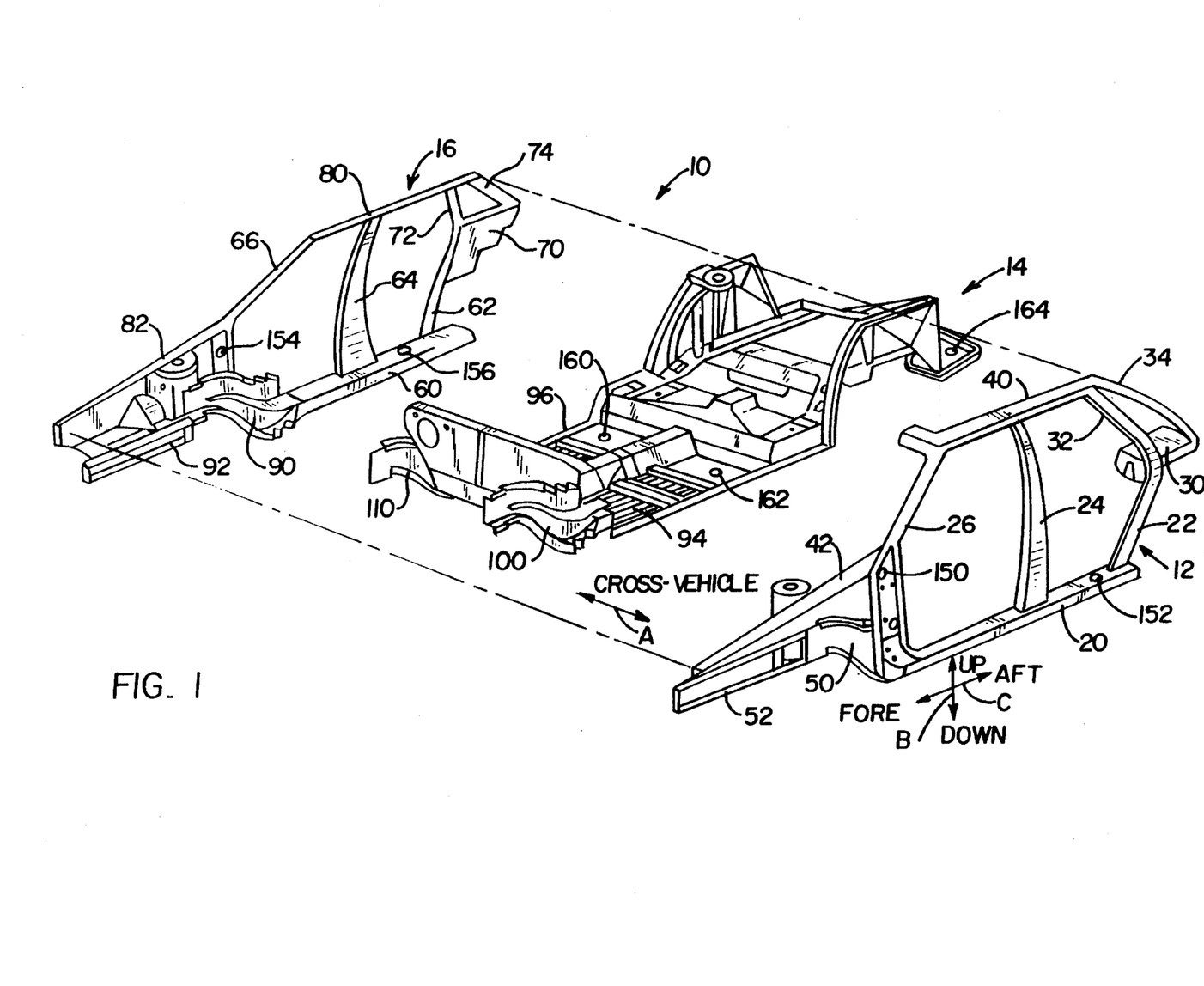
FIG. 1 is an exploded perspective view of a vehicle frame showing the underbody subassembly, the passenger side subassembly and the driver side subassembly.

Referring to FIG. 1, a vehicle body in white 10 for an automobile is shown in an exploded perspective view. Shown in FIG. 1 are a driver side subassembly 12, an underbody subassembly 14 and a passenger side subassembly 16. The roof subassembly is not shown. As is known to those skilled in the art, and as discussed in the BACKGROUND section above, vehicle body in white 10 is built by welding or mechanically joining the driver side subassembly 12 and the passenger side subassembly 16 to the underbody subassembly 14 and then finally, joining the roof subassembly (not shown) to the driver side subassembly 12 and the passenger side subassembly 16. After this, closure panels (not shown) are secured to the body in white to form the vehicle body construction.

The driver side subassembly 12 consists of a rocker sill 20, to which a lower C-post 22, a B-post 24, and an upper A-post extrusion 26 are weldedly attached. A package tray 30 is weldedly attached to the lower C-post 22. The upper C-post 32 and D-post 34 are weldedly attached to the package tray 30. The tops of the upper A-post extrusion 26, the B-post 24, the upper C-post 32 and the D-post 34 are weldedly attached to the roof side rail 40. Attached to the A-post extrusion 26 is the shotgun 42.

An S-portion component 50 connects the rocker sill 20 to the front body side rail 52. As is known, the shape of the S-portion component 50 is dictated by the need for the frame to form a wheel well area. Thus, the S-portion curves inwardly (in the cross-vehicle direction, as indicated by arrow A) and upwardly (in the up-down direction as indicated by arrow B). Thus, it forms an S-shape, and hence the name S-portion is given to this component.

The passenger side subassembly 16 also consists of a rocker sill 60, to which a lower C-post 62, a B-post 64 and an A-post extrusion 66 are weldedly attached. A package tray 70 is weldedly attached to the lower C-post 62 and the upper C-post 72 and D-post 74 are weldedly attached to the package tray 70. The tops of the upper A-post extrusion 66, the B-post 64, the C-post 72 and the D-post 74 are weldedly attached to the roof side rail 80. Attached to the A-post 66 is the shotgun 82. As with the driver side subassembly 12, an S-portion component 90 connects the rocker sill 60 to the body side rail 92.

The underbody subassembly 14 includes a driver side portion 94 and a passenger side portion 96. Disposed on the driver side portion 94 is an S-portion component 100 which, as will be described in much greater detail hereinbelow, is complementary to S-portion component 50 on the driver side subassembly 12. Once again, S-portion component 100 curves inwardly and upwardly to define the wheel well area. Disposed on the passenger side portion 96 is an S-portion component 110 which, as will also be described in much greater detail hereinbelow, is complementary to S-portion component 90 on the passenger side subassembly 16.

Referring still to FIG. 1, the passenger side subassembly 12 includes a control hole 150 and a control slot 152. Initially, the control hole 150 and control slot 152 are used to facilitate assembling the passenger side subassembly 12 itself. As is known to those skilled in the art, a passenger side subassembly fixture (not shown) is provided in order to assemble the individual components (e.g., A-post extrusion, B-post, etc.) into the passenger side subassembly 12. The process consists of hanging the A-post extrusion 26 from a pin (not shown) of the passenger side subassembly fixture and then assembling the remaining components to the A-post extrusion 26.

The control slot 152 is also used to hang the rocker sill 20 to another pin on the passenger side subassembly fixture. This provides another alignment and positioning point. It will be appreciated that only a certain minimum number of slots and holes are used in order not to unduly constrain the assembly of the components.

The driver side subassembly 16 is built in the same manner as the passenger side subassembly 12. Shown on FIG. 1 are control hole 154 and control slot 156 of the driver side subassembly 16. These are used in the same manner as were control hole 150 and control slot 152 respectively.

The assembled driver side subassembly 16 and passenger side subassembly 12 are then moved to the area where the vehicle body in white 10 is assembled. As is known to those skilled in the art, a vehicle body in white framing fixture (not shown) is used to facilitate final assembly of the driver side subassembly 16 and the passenger side subassembly 12 to the underbody subassembly 14 and the roof subassembly (not shown) to the passenger side subassembly 12 and the driver side subassembly 16. The vehicle body in white framing fixture has a base having alignment pins projecting upwardly therefrom. The underbody subassembly 14 is placed on the base such that the alignment pins project through control holes 160 and 162 and two control slots, only one of which, control slot 164, is shown in FIG. 1.

Once the underbody subassembly 14 is in place on the body in white framing fixture, either the passenger side subassembly 12 or the driver side subassembly 16 is brought into the vehicle body in white framing fixture. Assume that the passenger side subassembly 12 is first brought into the framing fixture. The body in white framing fixture includes a first pin (not shown) which engages into control hole 150 and a second pin (not shown) which engages into control slot 152. The pins align the passenger side subassembly 12 with the underbody subassembly 14. Once the passenger side subassembly 12 is hung on the pins and aligned with the underbody subassembly 14, the driver side subassembly 16 is brought into the vehicle body in white framing fixture and the first pin engages into control hole 154 and the second pin engages into control slot 156.

Despite the use of the subassembly fixture for assembling the passenger side subassembly 12 and driver side subassembly 16 from their respective component parts, manufacturing and assembly variations can arise such that the individual components are not aligned correctly. The manufacturing variations are caused in the actual manufacturing of the individual components. A particular individual component may be shorter, longer, wider or more narrow than the specifications demand. The assembly variations can arise when actually assembling the individual components to form the completed subassembly.

The variations manifest themselves when the passenger side subassembly 12 and the driver side subassembly 16 are hung from the alignment pins in the framing fixture. As was discussed above, the S-portion components 50, 90, 100, 110 curve inwardly and upwardly. Because conventional S-portion components are joined along a curved surface, there is only one unique location at which there will be a perfect meeting of the S-portion components. If there are any variations present, the conventional S-portion components will not join at this unique location thus causing gaps. As was discussed above, these gaps had sometimes been remedied by using putty fillers or by deforming the sheet metal of the S-portion components.

The S-portion components 50, 90, 100, 110 of the invention are designed to absorb the variations without the disadvantages of the prior art solutions while at the same time providing extra strength and stiffness to the vehicle body construction without the addition of extra weight or reinforcements.

Figure 2:
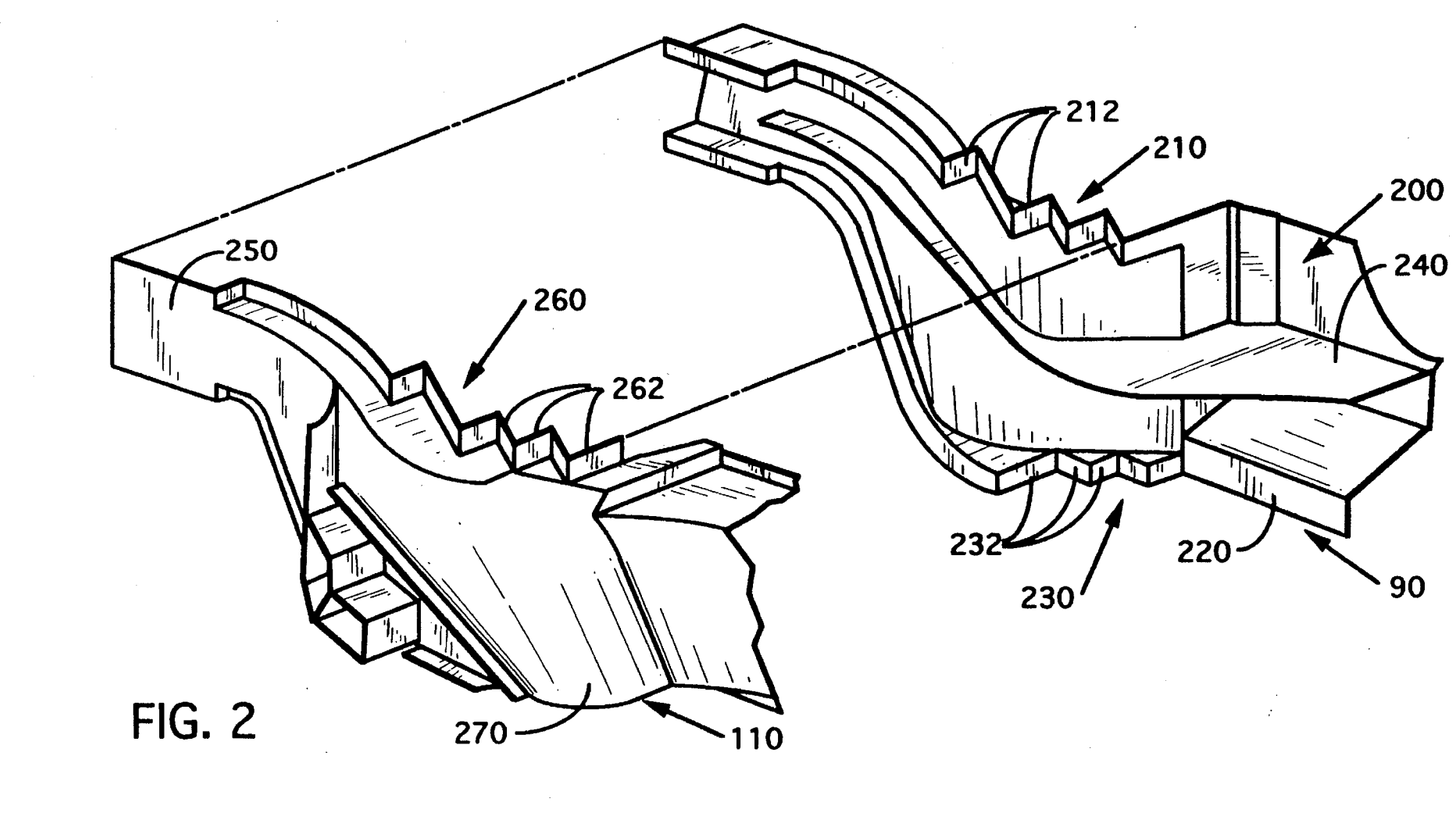
FIG. 2 is an exploded perspective view of both components of the S-portion before they are joined.

Referring now to FIG. 2, the passenger side subassembly S-portion component 90 and the underbody subassembly passenger side portion S-portion component 110 are shown. S-portion component 90 includes an upper portion 200 having step means 210 consisting of a plurality of steps 212. The S-portion component 90 also includes a lower portion 220 having step means 230 consisting of a plurality of steps 232. The S-portion component 90 also includes an integrally formed stiffener flange 240 extending along the length of the S-portion component 90. It will be appreciated that other sizes and shapes of the stiffener flange 240 can be utilized depending on the strength and weight characteristics desired by the designer.

Still referring to FIG. 2, S-portion component 110 also includes an upper portion 250 having step means 260 consisting of a plurality of steps 262 and a lower portion 270 including step means consisting of a plurality of steps (not shown). It will be appreciated that steps 212 are complementary with steps 262 and steps 232 are complementary with the steps (not shown) on lower portion 270 of the S-portion component 110.

The S-portion components 90 and 110 are made of an aluminum alloy and may preferably be casted (and even vacuum die casted), although it will be appreciated that other materials and other manufacturing methods can be used. A casting process allows the S-portion components to be integrally formed and also allows for adjustment of the thickness of the material in the different areas of the S-portion component as needed for structural performance as well as providing a means to locally add material thickness, ribs and other rigidizing and strengthening devices in an efficient and effective manner without adding material thickness all over the component or adding separate parts which must be attached by fasteners. The die casting process provides cast aluminum having high toughness and ductility needed for crash loading deformation. The S-portion components 90, 110 are preferably made of an aluminum alloy such as A356 or other variants thereof.

Figure 3A:
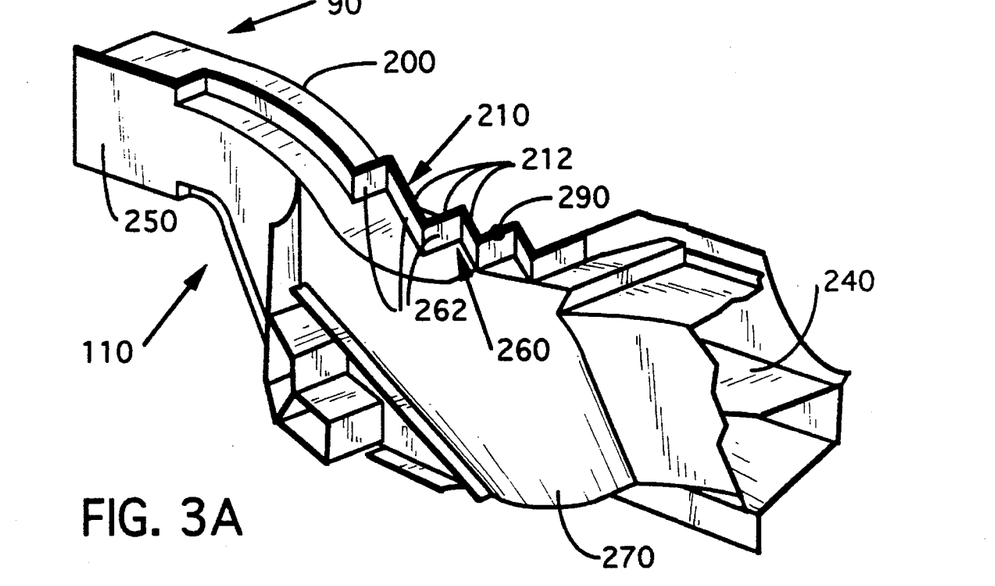
FIG. 3A is a perspective view showing the two components of S-portion being joined together.
Figure 3B:
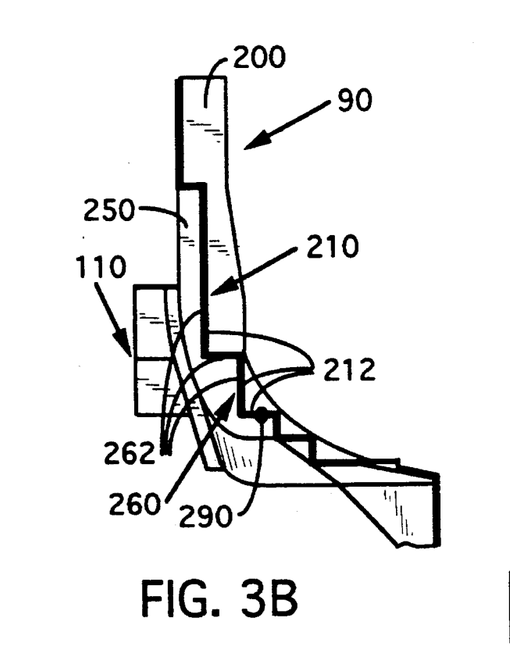
FIG. 3B is a top plan view of the S-portion shown in FIG. 3A.
Figure 3C:
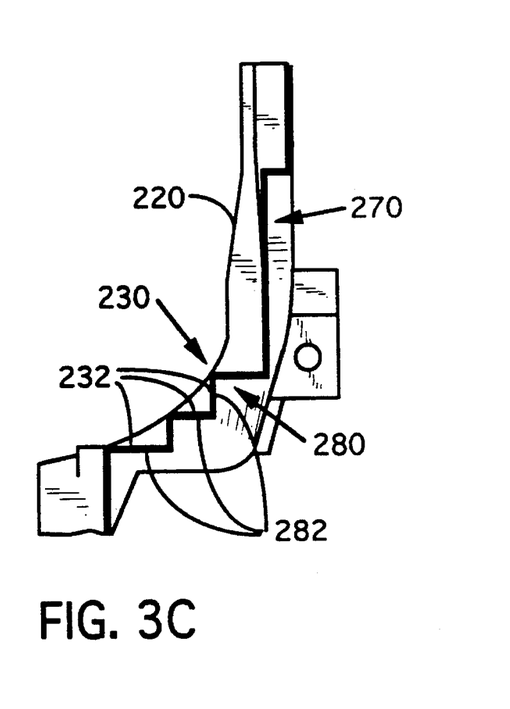
FIG. 3C is a bottom plan view of the S-portion shown in FIG. 3A.

Referring now to FIGS. 3A, 3B and 3C, the S-portion components 90 and 110 are showed joined to one another. S-portion component 90 and S-portion component 110, as part of its respective subassembly, are welded together, along with the rest of the sections of the subassemblies, to form the vehicle space frame. The S-portion components 90 and 110 are welded together at several points, among them, the complementary step means of the S-portion components 90, 110. As can be seen in FIGS. 3A and 3B, step means 210 are complementary to step means 260 and as can be seen in FIG. 3C step means 230 are complementary to step means 280 including steps 282. The step means 210, 260 and 230, 280 are also in confronting relationship with each other as can best be seen in FIGS. 3B and FIG. 3C respectively. Preferably, at least portions of the step means 210 and 230 are in intimate surface-to-surface contact with portions of step means 260 and 280, respectively.

The S-portion components 90 and 110 are preferably welded together by gas metal arc ("gma") fillet welds or gma slot welds although it will be appreciated that other joining methods such as mechanical joining means can be used. The welds can be made all along the step means where the step means contact the complementary step means of the other S-portion component. For example, a weld 290 is shown joining step means 260 to step means 210.

Figure 4:
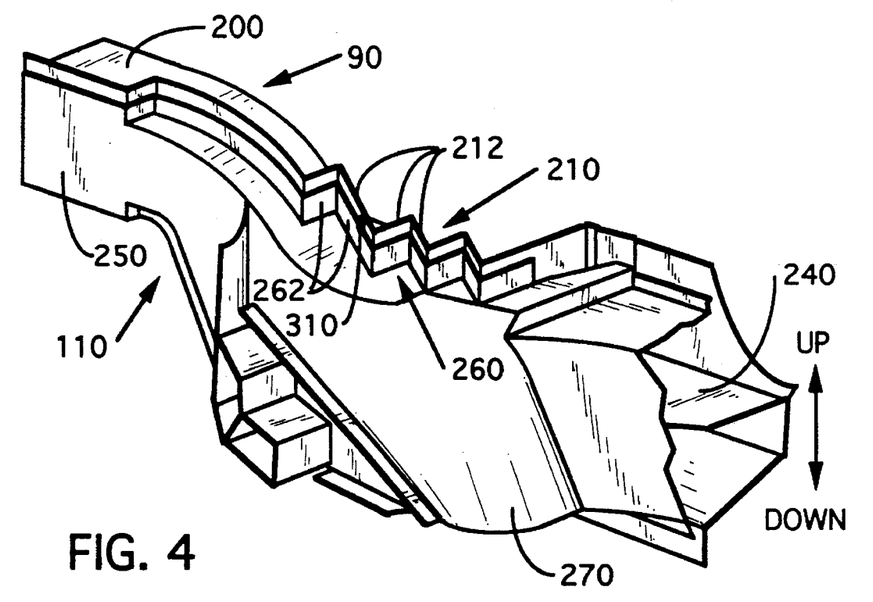
FIG. 4 is a perspective view showing the two components of the S-portion being joined together with the components being shifted relative to each other in the up-down direction.
Figure 5A:
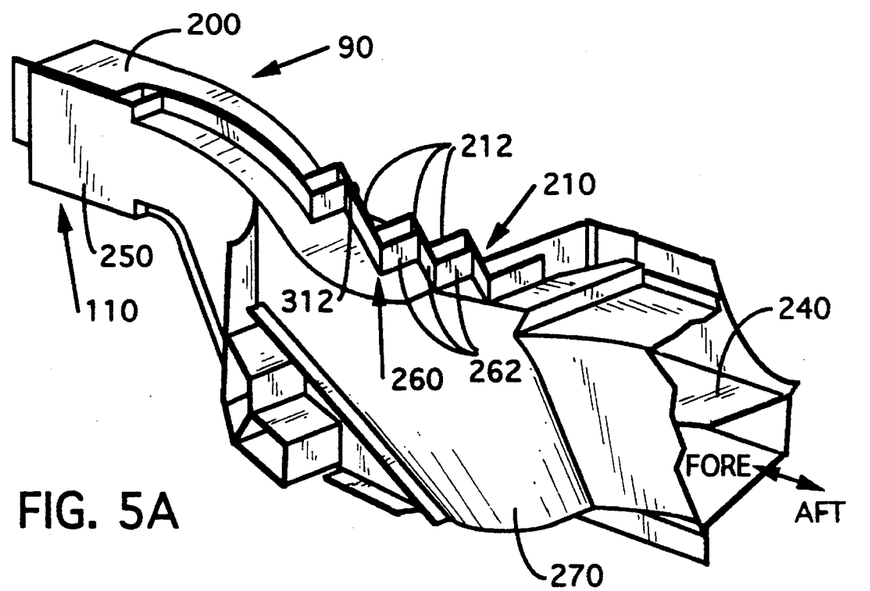
FIG. 5A is a perspective view showing the two components of the S-portion being joined together with the components being shifted relative to each other in the fore-aft direction.
Figure 5B:
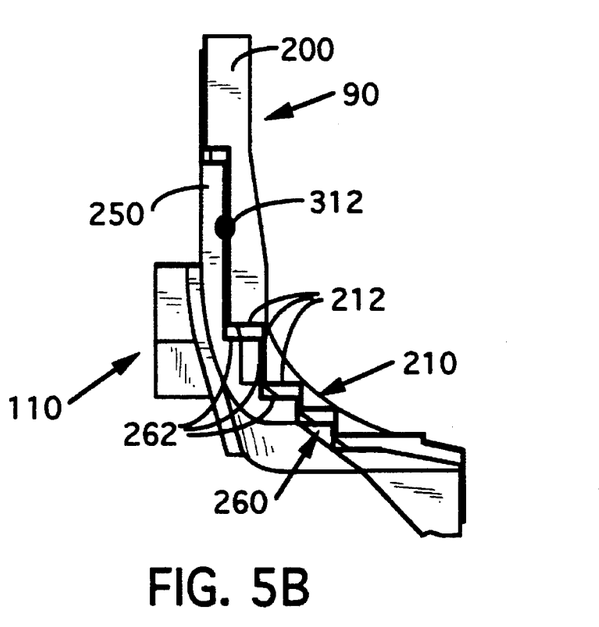
FIG. 5B is a top plan view of the S-portion shown in FIG. 5A.
Figure 5C:
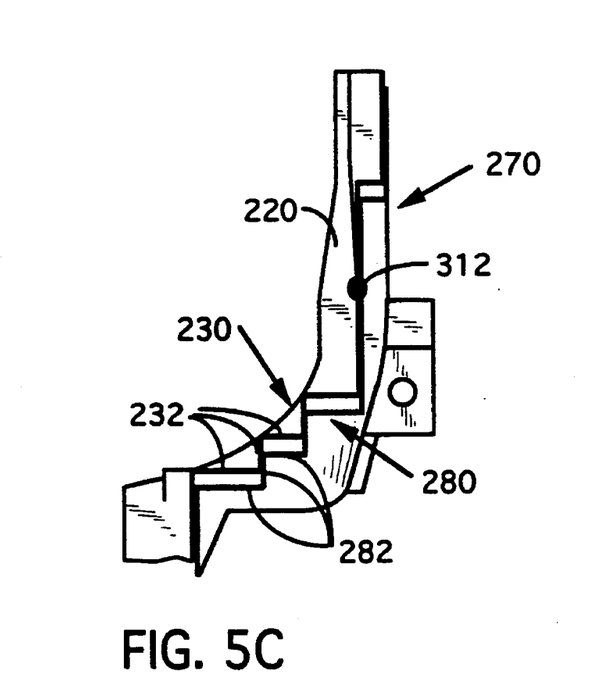
FIG. 5C is a bottom plan view of the S-portion shown in FIG. 5A.
Figure 6A:
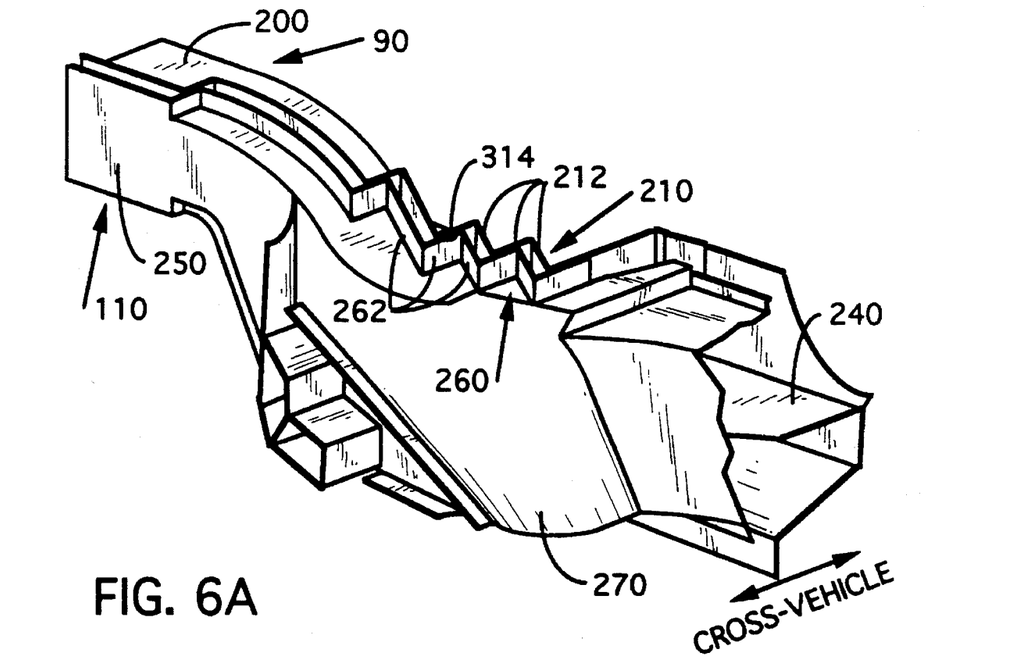
FIG. 6A is a perspective view showing the two components of the S-portion being joined together with the components being shifted relative to each other in the cross-vehicle direction.
Figure 6B:
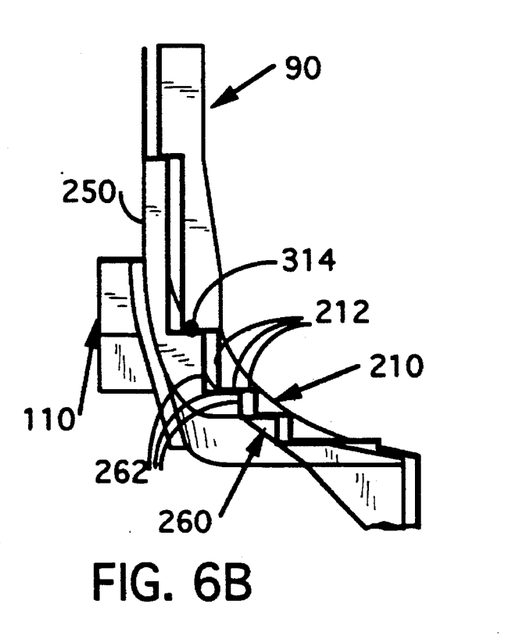
FIG. 6B is a top plan view of the S-portion shown in FIG. 6A.
Figure 6C:
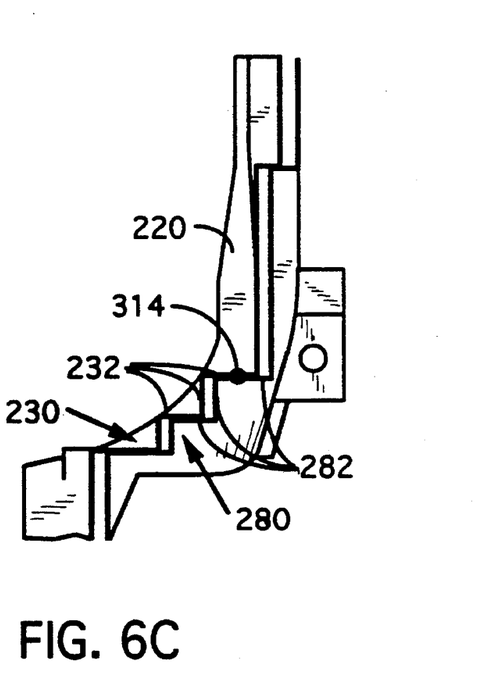
FIG. 6C is a bottom plan view of the S-portion shown in FIG. 6A.

In accordance with the invention, the S-portion components 90 and 110 can be positioned relative to each other in order to absorb the tolerances mentioned above while still providing a proper mating surface that can be effectively and efficiently joined together. As can be seen in FIG. 4, the S-portion components 90 and 110 can be moved up or down relative to each other. In this way tolerances in the up-down direction can be absorbed by the S-portion so that the vehicle frame can be welded in proper alignment. Referring now to FIGS. 5A, 5B, 5C, S-portion 90 and S-portion 110 can be moved fore or aft relative to each other. FIGS. 6A, 6B and 6C show S-portion 90 and S-portion 110 being moved in the cross-vehicle direction. It will be appreciated that movement in the up-down, fore-aft or cross-vehicle direction will still maintain a proper mating surface for a weld, as can be seen with weld 310 on FIG. 4, weld 312 on FIGS. 5A–5C and weld 314 on FIGS. 6A–6C.

Figure 7:
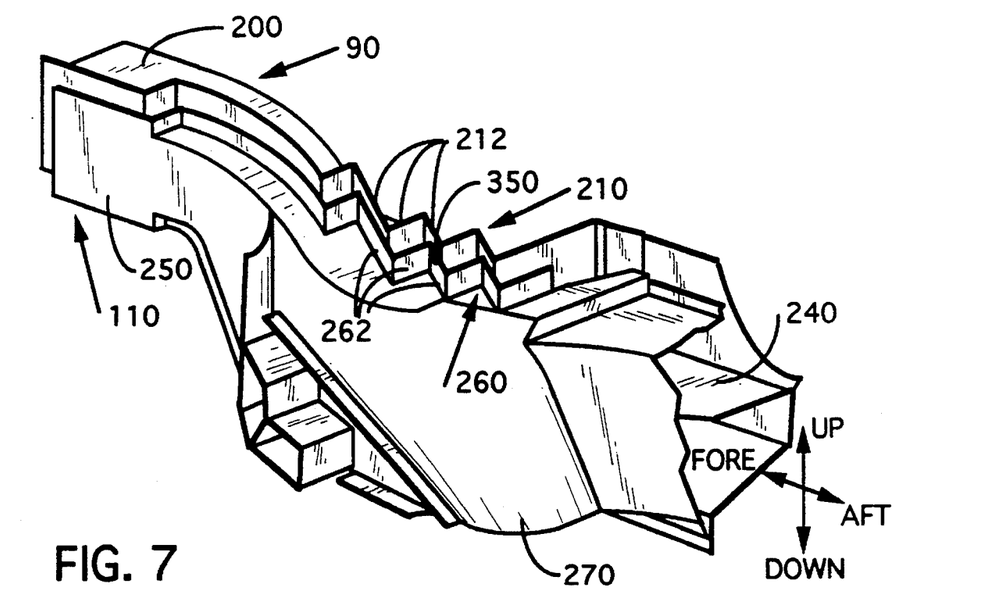
FIG. 7 is a perspective view showing the two components of the S-portion being joined together with the components being shifted relative to each other in both the up-down direction and the fore-aft direction.
Figure 8:
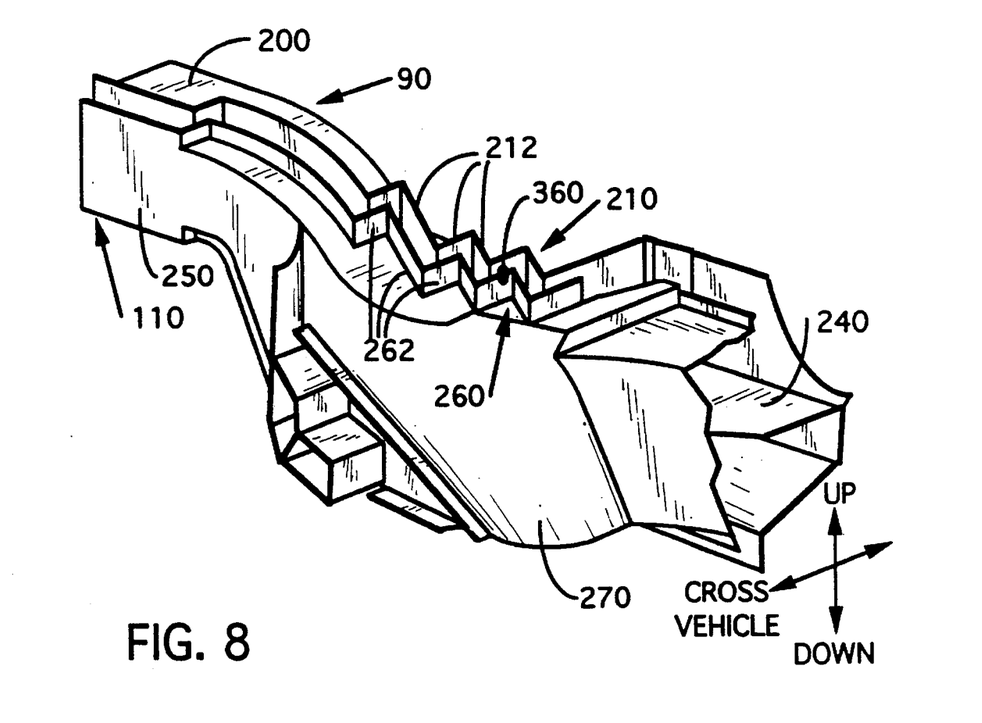
FIG. 8 is a perspective view showing the two components of the S-portion being joined together with the components being shifted relative to each other in both the up-down direction and cross-vehicle direction.

As is known in the art, the subassemblies do not usually need to be adjusted in the cross-vehicle direction. This is because the cross-vehicle dimension is usually set by one component of the vehicle frame, such as the floor pan or roof panel. This means there is less variation in the cross-vehicle dimension and thus less of a need for an adjustment in that direction. However, the subassemblies may have to be adjusted in both the up-down direction and the fore-aft direction. This is shown in FIG. 7. It will be appreciated that movement in both the up-down and fore-aft direction will still maintain a proper mating surface for a weld, as can be seen with weld 350 on FIG. 7. In the rare instance where the subassemblies need to be adjusted in both the up-down and cross-vehicle direction, this can also be accomplished as is shown in FIG. 8. It will be appreciated that movement in both the up-down and cross-vehicle direction will still maintain a proper mating surface for a weld, as can be seen with weld 360 on FIG. 8.

The design and geometry of the S-portion components are dependent on the following factors: (i) the space available for the S-portion; (ii) the width and curvature which contain the steps; (iii) the degree of variation to be absorbed; (iv) the amount of weld length needed; (v) practical considerations such as manufacturing limits for the casting of the component; (vi) stress concentration and distribution; and (vii) aesthetics.

It will be appreciated that an S-portion for a vehicle frame is provided in which the S-portion components have step means which are in a complementary and confronting relationship with each other. In this way, relative sliding movement between the S-portion components can be achieved so as to establish desired positioning of the S-portion components relative to each other.

While specific embodiments of the invention have been disclosed, it will be appreciated by those skilled in the art that various modifications and alterations to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. An S-portion for a frame-type vehicle body construction, said S-portion comprising:

a first S-portion component having step means;

a second S-portion component having step means; and said step means being in complementary and confronting relationship with each other so as to permit relative sliding movement therebetween, whereby desired positioning of said first S-portion component relative to said second S-portion component can be established.

2. The S-portion of claim 1, wherein said first S-portion component has an upper section and a lower section;

said second S-portion component has an upper section and a lower section;

said step means of said first S-portion component includes step members disposed on said upper section of said first S-portion component and step members disposed on said lower section of said first S-portion component; and said step means of said second S-portion component includes step members disposed on said upper section of said second S-portion component and step members disposed on said lower section of said second S-portion component.

3. The S-portion of claim 2, wherein said step members include a plurality of steps.

4. The S-portion of claim 3, wherein a portion of said step means of said first S-portion component is in intimate surface-to-surface contacting relationship with a portion of said step means of said second S-portion component.

5. The S-portion of claim 1, including weld means securing said first S-portion component to said second S-portion component.

6. The S-portion of claim 5, wherein said weld means are selected from the group consisting of a gma fillet weld and a gma slot weld.

7. The S-portion of claim 4, wherein at least one of said first and second S-portion components include integrally formed ribs to strengthen said S-portion.

8. The S-portion of claim 1, wherein said S-portion is made from an aluminum alloy.

9. The S-portion of claim 1, wherein said step means are integrally formed in said first and second S-portion components.

10. A vehicle body construction comprising:

an underbody subassembly including a passenger side portion and a driver side portion, said passenger side portion including a first S-portion component having step means and said driver side portion including a second S-portion component having step means;

a passenger side subassembly including a third S-portion component having step means, said step means of said third S-portion component and said step means of said first S-portion component being in complementary and confronting relationship with each other so as to permit relative sliding movement therebetween, whereby desired positioning of said passenger side subassembly relative to said underbody subassembly can be established;

a driver side subassembly including a fourth S-portion component having step means, said step means of said fourth S-portion component and said step means of said second S-portion component being in complementary and confronting relationship with each other so as to permit relative sliding movement therebetween, whereby desired positioning of said driver side subassembly relative to said underbody subassembly can be established; and closure panels secured to said passenger side subassembly and said driver side subassembly to form said vehicle body construction.

11. The vehicle body construction of claim 10, including first weld means securing said first S-portion component to said third S-portion component such that said passenger side subassembly is welded to said underbody subassembly; and second weld means securing said second S-portion component to said fourth S-portion component such that said driver side subassembly is welded to said underbody subassembly.

12. The vehicle body construction of claim 10, wherein each of said S-portion components has an upper section and a lower section; and said step means of each of said S-portion components includes step members disposed on said upper section of each of said S-portion components and step members disposed on said lower section of each of said S-portion components.

13. The vehicle body construction of claim 12, wherein said upper section and said lower section step members include a plurality of steps.

14. A method of assembling a vehicle body construction comprising:

providing an underbody subassembly including a passenger side portion and a driver side portion, said passenger side portion including a first S-portion component having step means and said driver side portion including a second S-portion component having step means;

providing a passenger side subassembly including a third S-portion component having step means;

providing a driver side subassembly including a fourth S-portion component having step means;

establishing relative sliding movement of said step means of said first S-portion component and said step means of said third S-portion component to effect desired positioning of said passenger side subassembly relative to said underbody subassembly;

establishing relative sliding movement of said step means of said second S-portion component and said step means of said fourth S-portion component to effect desired positioning of said driver side subassembly relative to said underbody subassembly;

securing said passenger side subassembly to said underbody subassembly;

securing said driver side subassembly to said underbody subassembly; and securing closure panels to said driver side subassembly and said passenger side subassembly to form said vehicle body construction.

15. The method of claim 14, including securing said passenger side subassembly to said underbody subassembly by welding a portion of said step means of said first S-portion component to a portion of said step means of said third S-portion component.

16. The method of claim 14, including securing said driver side subassembly to said underbody subassembly by welding a portion of said step means of said second S-portion component to a portion of said step means of said fourth S-portion component.

17. The method of claim 14, including providing as said step means, step members disposed on an upper section of each of said S-portion components and step members disposed on a lower section of each of said S-portion components; and providing said upper section and said lower section step members with a plurality of steps.

18. The method of claim 14, including establishing relative sliding movement of said step means of said first S-portion component and said step means of said third S-portion component in (i) an up and down direction; and (ii) a fore and aft direction; and establishing relative sliding movement of said step means of said second S-portion component and said fourth S-portion component in (i) an up and down direction; and (ii) a fore and aft direction.

19. The method of claim 14, including providing said S-portion components with integral stiffening means to strengthen said S-portion.

20. The method of claim 14, including providing each of said S-portion components by casting an aluminum alloy.

* * * * *

UNITED STATES PATENT AND TRADEMARK OFFICE
CERTIFICATE OF CORRECTION

PATENT NO. : 5,480,208
DATED : January 2, 1996
INVENTOR(S) : John W. Cobes et al.

It is certified that error appears in the above-indentified patent and that said Letters Patent is hereby corrected as shown below:

On title page, item [54] and column 1, lines 1-3,

The Corrected Title should read:

S-Portion For A Frame-Type Vehicle
Body Construction, A Vehicle Body Construction
And An Associated Method Signed and Sealed this Twenty-fifth Day of March, 1997

Attest:

BRUCE LEHMAN

Attesting Officer

Commissioner of Patents and Trademarks